United States Patent [19]

Krusemark et al.

[11] 4,418,597

[45] Dec. 6, 1983

[54] ANTI-KICKBACK DEVICE

[75] Inventors: Kenneth J. Krusemark, Hutchinson, Kans.; James L. Stackhouse, Jr., Florissant, Mo.

[73] Assignee: Emerson Electric Co., St. Louis, Mo.

[21] Appl. No.: 340,103

[22] Filed: Jan. 18, 1982

[51] Int. Cl.[3] .......................... B26D 7/22; B23D 7/27; B27G 19/00; B27G 21/00

[52] U.S. Cl. .......................................... 83/478; 83/440; 83/440.2; 144/251 R

[58] Field of Search ....................... 83/440, 440.2, 447, 83/469, 475, 477.2, 478, 544, 860; 24/115 L, 132 WL, 134 P; 144/251 A, 251 R

[56] References Cited

U.S. PATENT DOCUMENTS

| | | | |
|---|---|---|---|
| 1,082,870 | 12/1913 | Humason | 83/440.2 |
| 1,465,224 | 8/1923 | Lantz | 83/440.2 |
| 2,095,330 | 10/1937 | Hedgpeth | 83/440.2 |
| 2,593,596 | 4/1952 | Olson | 83/440.2 |
| 2,750,970 | 6/1956 | Gaskell | 83/440.2 |
| 2,761,199 | 9/1956 | Allen | 29/270 |
| 3,204,311 | 9/1965 | Laviano | 24/115 L |
| 4,238,108 | 12/1980 | Muetterties | 24/115 L |

*Primary Examiner*—E. R. Kazenske
*Assistant Examiner*—Paul M. Heyrana, Jr.
*Attorney, Agent, or Firm*—Charles E. Markham

[57] ABSTRACT

A flat support member mounted on and extending above a horizontal worktable has an elongated, inclined slot therein with a rack formed along its upper side, a wheel lying along one side of the member and rolling on a workpiece on the table has a coaxial pinion gear of smaller diameter than the slot width fixed to one face thereof and loosely retained in the slot, horizontal movement of the workpiece in one direction moves the pinion horizontally out of engagement with the rack and causes rotation of wheel and pinion in one direction and movement of the workpiece in a reverse direction moves the pinion horizontally into engagement with the rack and causes rotation of the wheel and pinion in an opposite direction to apply downward pressure of the wheel on the workpiece.

14 Claims, 21 Drawing Figures

14a
28
26
28
34
42
48
50
48
38
30a

30

32

30

36
32

26
9
9

36
26

28
14a
22a
30a

28

34

10a 38
40

34
36

ANTI-KICKBACK DEVICE

This invention relates to devices for preventing the kickback of a workpiece by a powered tool.

BACKGROUND OF THE INVENTION

When manually feeding a workpiece toward a rotating circular saw blade or cutting tool as in a table saw or jointer, thickness or shaper plane or when ripping the workpiece on a radial arm saw a kickback of the workpiece by the rotating tool or blade occasionally occurs creating a hazard. Kickbacks may occur for various reasons but most frequently result from a binding of the workpiece between the rotating blade and fence or pinching of the cutting tool in the kerf of the workpiece.

Heretofore anti-kickback devices have conventionally comprised some form of gravity actuated or spring pressed, pivoted pawls arranged to slide over the surface of a workpiece when moved in a feeding direction or when the cutting blade is moved through the workpiece in a feeding direction and to dig into the surface of the workpiece to stop kickback movement of the workpiece in a reverse direction toward the operator. Usually these pawls are provided with one or more relatively sharp teeth in contact with the surface of the workpiece and which in instances causes objectionable marring of the surface. Moreover, the pressure of these spring pressed pawls on the upper surface of a workpiece resting on a worktable varied with the thickness of the workpiece were ineffective when making bevel cuts and were also ineffective to prevent kickbacks of workpieces having hard, smooth surfaces because of their failure to dig in to such surfaces.

OBJECTS OF THE INVENTION

An object of this invention is to provide a generally new and improved anti-kickback device which is reliable in operation and overcomes the objectionable features of presently employed and prior devices of this kind;

A further object is to provide an anti-kickback device in which the element in contact with the surface of the workpiece is non-marring;

A further object is to provide an anti-kickback device which is effective in preventing the kickback of workpieces of various thicknesses;

A further object is to provide an anti-kickback device whic is effective in preventing the kickback of workpieces having hard, smooth surfaces;

A further object is to provide an anti-kickback device in which a wheel having a deformable peripheral portion is freely moveable vertically and maintained in light frictional, rolling contact with the surface of a workpiece by gravity and is forcibly pressed downward against the workpiece surface and deformed to increase the area of contact and frictional resistance to slippage thereon when a kickback of the workpiece occurs;

A further object is to provide an anti-kickback device in which downward force is applied to a wheel normally in light frictional rolling contact with the surface of a workpiece by rack and pinion means when a kickback of the workpiece occurs.

Further objects and advantages will appear when reading the following description of the invention.

IN THE DRAWINGS

Figures 8, 9, 10, 11, 12, 13, 14, 15, 16, 17, 18, 19, 20, 21:
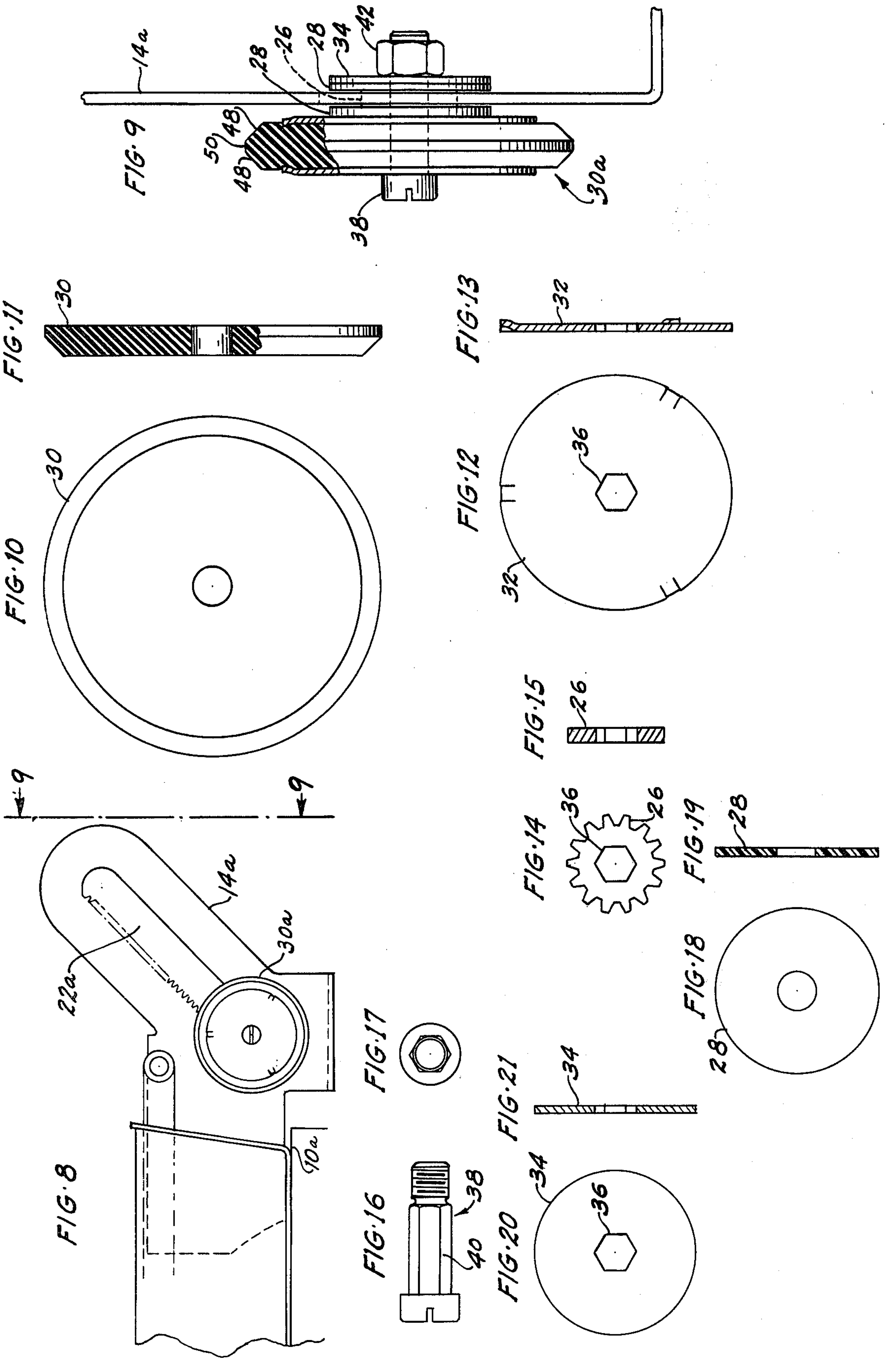
FIG. 8 is a side elevational view of a single-wheel type of anti-kickback device constructed in accordance with the present invention mounted on the spreader of a table saw.
FIG. 9 is an enlarged rear end view of the single wheel type shown in FIG. 8 with parts shown in cross section and is taken along line 9—9 of FIG. 8.
FIGS. 10 and 11 are face and cross-sectional views of the wheels employed in the two-wheel type anti-kickback device.

FIGS. 12 nd 13 are face and cross-sectional views of the rigid metal support discs lying against the faces of the pliable wheels and are employed in both single and two-wheel type anti-kickback devices.

FIGS. 14 and 15 are face and cross-sectional views of the pinion gear employed in both single and two-wheel type devices;

FIGS. 16 and 17 are side and end elevational views of the bolt forming a driving connection between the wheels and pinion gears employed in both single and two-wheel devices;

FIGS. 18 and 19 are face and cross-sectional views of the plastic, anti-friction washers employed in both single and two-wheel type devices; and FIGS. 20 and 21 ae face and cross-sectional views of the rigid metal washers lying against the plastic anti-friction washers at one side of the wheels and are employed in both single and two-wheel devices.

DESCRIPTION OF FORMS OF THE INVENTION AS APPLIED TO A TABLE SAW

Referring to FIGS. 1 to 7 of the drawings which illustrate a two-wheel type anti-kickback device mounted on a table saw. The table saw has a horizontal worktable 10 with front and rer sides and a motor driven circular saw blade 12 having a portion thereof extending above the table 10 and arranged to rotate toward the ront side of the table. A spreader 14 mounted on the rear side of the table comprises a vertically arranged flat member substantially the same thickness as the saw blade and in alignment therewith forms a rigid support member for mounting the anti-kickback device. The spreader 14 is also conventionally pivotally mounted on the saw table for tilting to various bevel positions about an axis 16. A hinged saw guard 18 shrouding the saw blade and resting on the saw table is connected to the spreader by a link 20.

There are two horizontally spaced, elongated and inclined sots 22 in spreader 14 extending upward at an angle of approximately 45 degrees above the horizontal surface of the worktable 10. The surfaces defining the upper sides of slots 22 are provided with teeth to form a rack 24 while the opposite; lower surfaces 25 are smooth. Centrally perforated pinion gears 26 of smaller overall diameter than the width of slots 22 and of slightly greater thickness than the thickness of spreader 14 are entered into slots 22. Centrally perforated washers 28 larger in diameter than the width of slots 22 and constructed of a low friction synthetic plastic material lie against opposite faces of the pinion gears 26 and loosely retain the pinion gears in slots 22. Lying face to face against one of the washers 28 and on opposite sides of the spreader are wheels 30 of larger diameter than the washers 28 coaxial with the pinions and washers.

Figure 3:
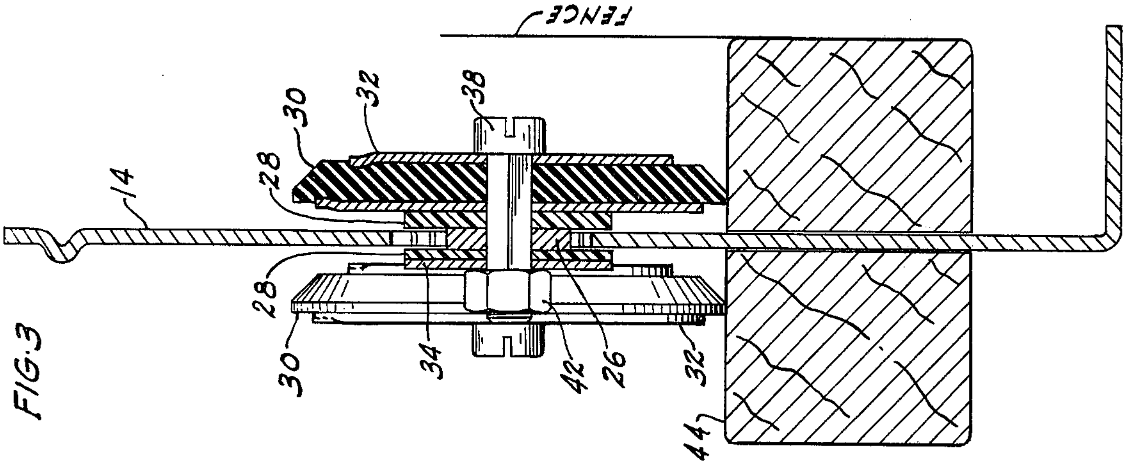
FIG. 3 is an enlarged cross-sectional view taken along line 3—3 of FIG. 2.
Figure 4:
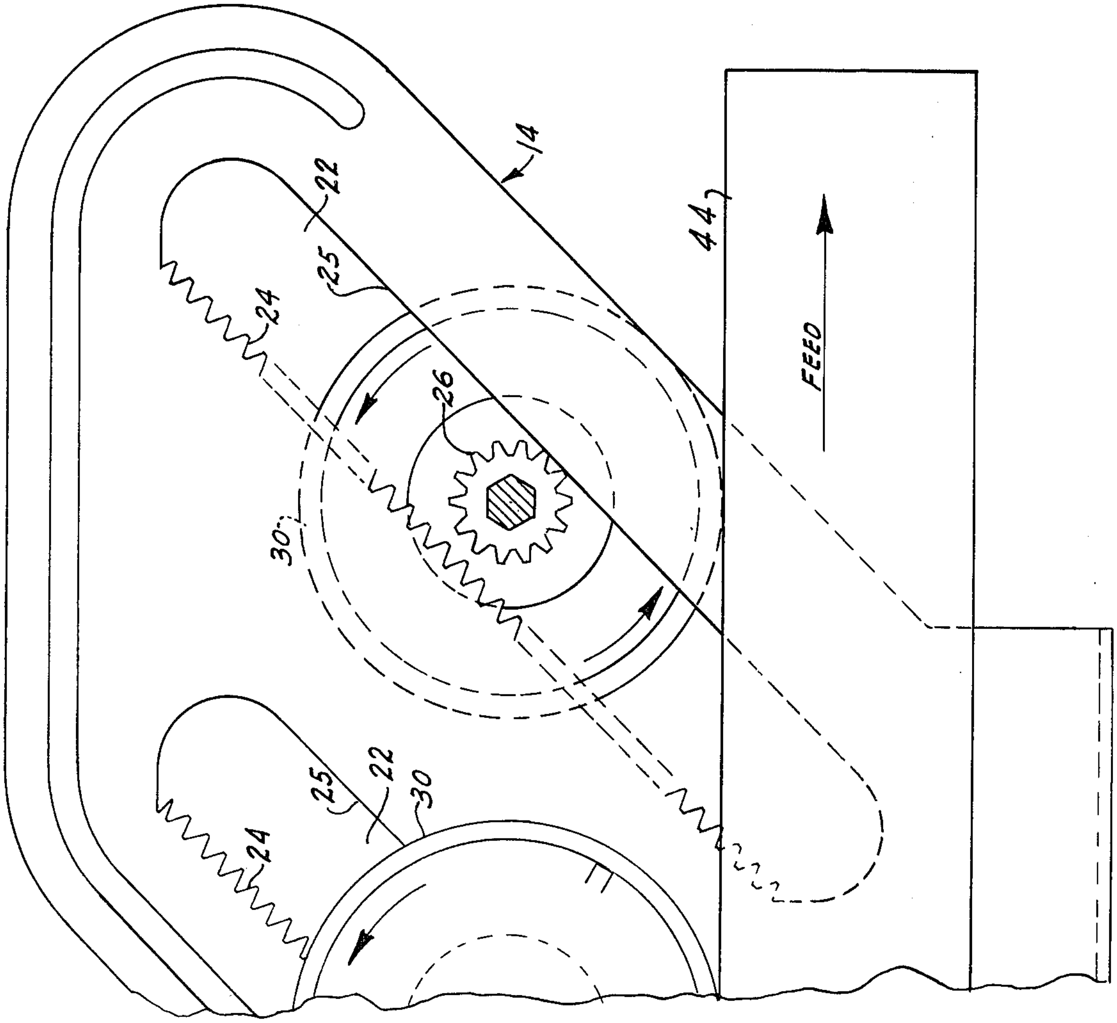
FIG. 4 is an enlarged fragmentary portion of FIG. 2, with parts shown in section, showing the operative positions and direction of rotation of the wheels and pinions when the wood plank is moving in a feeding direction.

Referring to FIG. 3, wheels 30 have smooth peripheral surfaces, are centrally perforated and are constructed of a synthetic rubber material having a durometer hardness in the order of 40. The wheels 30 each also include a pair of centrally perforated, circular metal support plates 32 of somewhat smaller diameter than the wheels 30 lying against opposite faces of the wheels thereby to provide a rigid wheel assembly having a deformable peripheral portion with a memory or recovery capability. Lying against each of the other plastic washers 28 on opposite sides of the spreader from the wheels are centrally perforated rigid metal washers 34 having substantially the same diameter as washers 28.

Referring to FIGS. 12, 14, 16 and 20, the central perforations 36 in wheel support plates 32, the pinion gears 26 and the metal washers 34 are of hexagonal configuration and bolts 38 having an intermediate portion 40 of hexagonal configuration in cross section passes through the perforations in these members and forms a driving connection between the wheels and pinion gears. The bolts 38 have heads at one end bearing against the wheels 30 and screw threaded portions at their other ends receiving nuts 42, which when tightened against washer 34 rigidly connect wheels, pinion gears and washers face to face thereby forming two assemblies which are free to move vertically the length of slots 22 and horizontally sufficiently to move the pinion gears 26 into and out of engagement with the racks 24. The support plates 32 lying against the opposite sides of wheels 30 are lanced radially at their peripheries and formed as shown in FIGS. 12 and 13 to provide inward extending tangs which dig into the pliable wheels 30 when nuts 42 are tightened thereby to preclude possible slippage.

OPERATION

Figure 1:
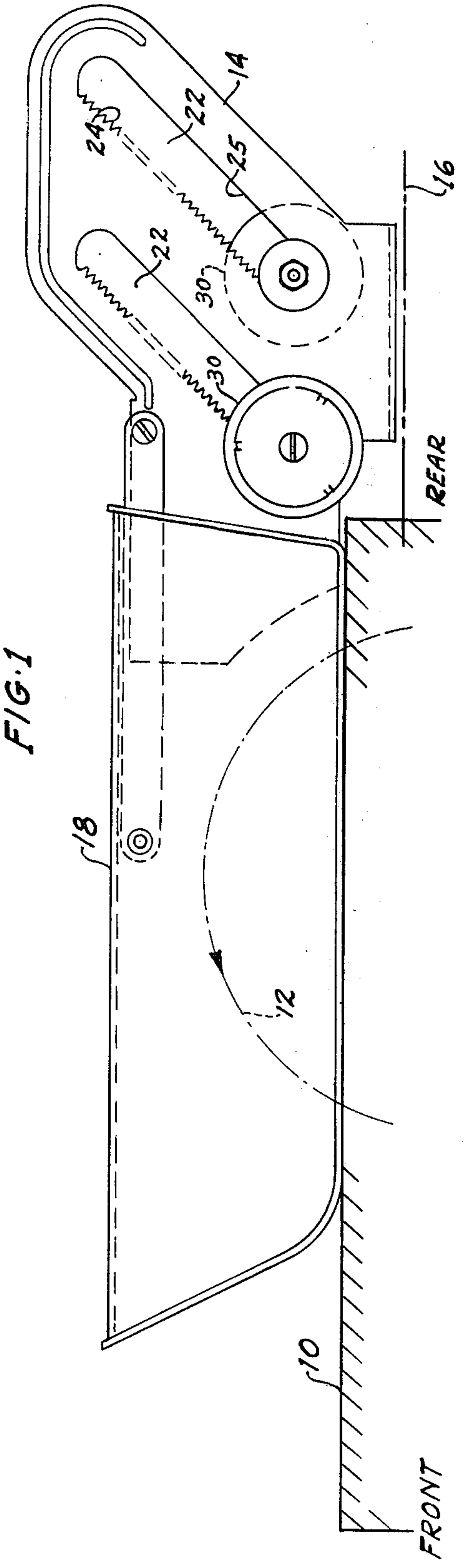
FIG. 1 is a side elevational view of a two-wheel type anti-kickback device constructed in accordance with the present invention shown mounted on the spreader of a table saw.
Figure 2:
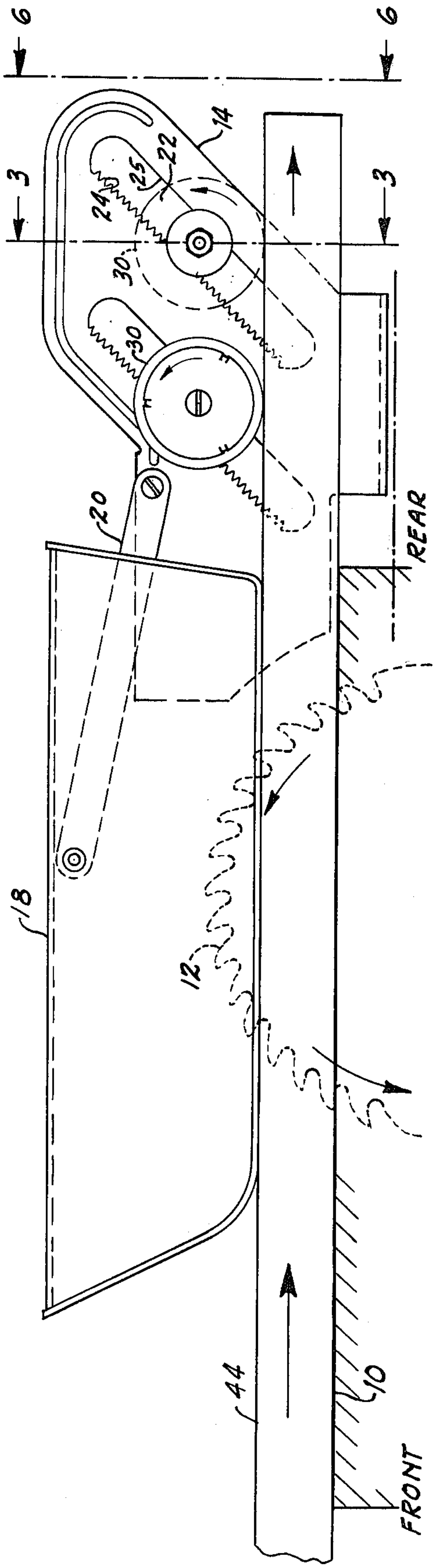
FIG. 2 is an operational view of the device shown in FIG. 1 showing the position of the device when ripping a wood plank resting on the saw table.

Normally the assemblies of wheels, pinions and washers fall by gravity to the bottom of inclined slots 22. When a workpiece such as a wood plank 44 is placed on the saw table and moved from front to rear through the saw blade to be ripped the separated portions lie on opposite sides of the spreader 14 and the wheels 30 are contacted by the forward ends of these plank portions and pushed upward so as to ride on the upper surfaces thereof as indicated in FIG. 2. When the plank 44 is moved in a feeding direction as indicated by arrows in FIGS. 2 and 4 the wheels and pinions will rotate in the direction indicated by arrows in FIG. 4 and the pinions will be in contact with the smooth sides 25 of slots 22.

Figure 5:
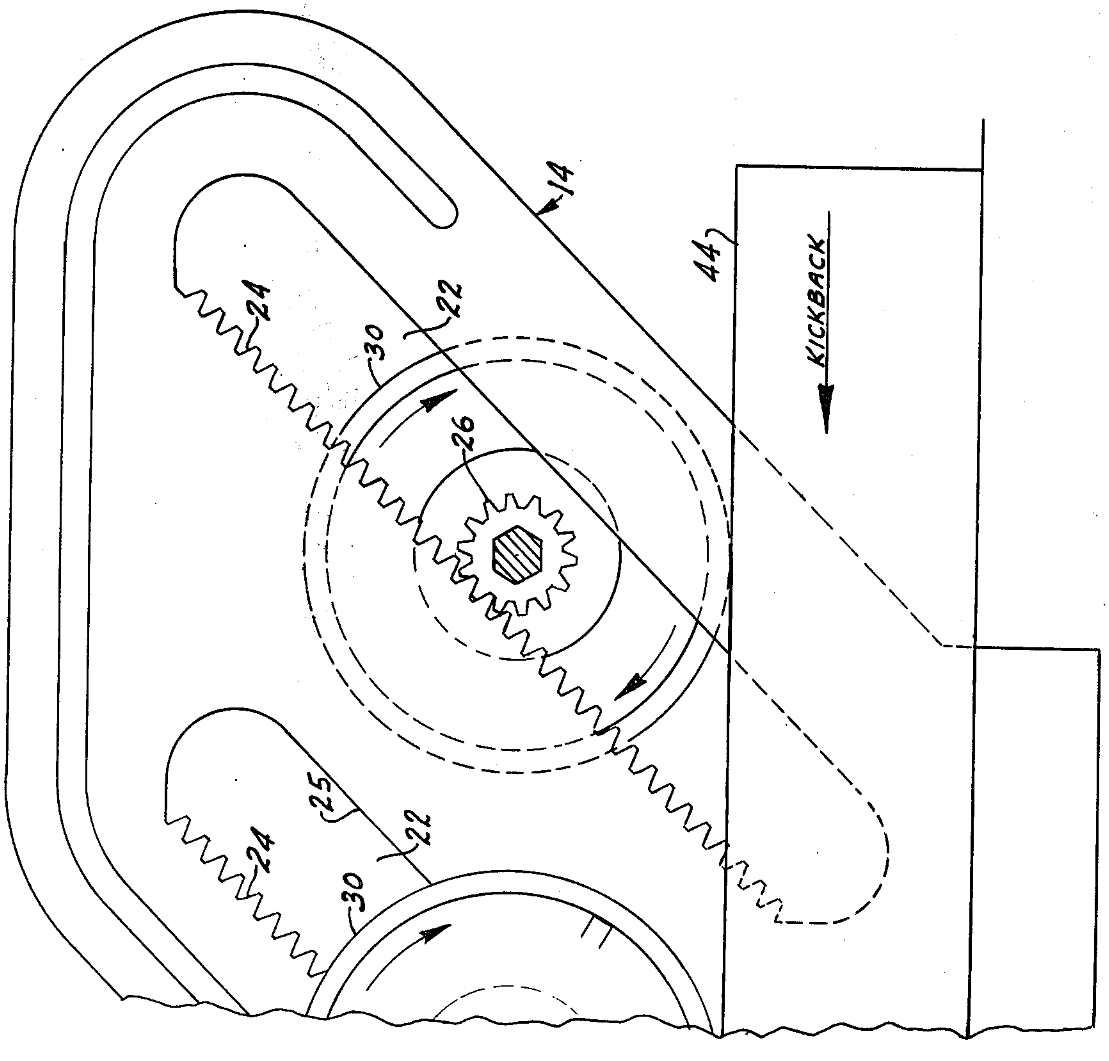
FIG. 5 is a view similar to FIG. 4 showing the operative positions and direction of rotation of the wheels and pinions when the workpiece initially moves in a kickback direction.

If a kickback movement of the plank occurs before the plank is completely ripped both wheels and pinions will be moved horizontally a slight distance to the left causing the pinions to engage the racks 24. Also when reverse movement of the plank occurs the wheels and pinions will be rotated in an opposite direction, as indicated in FIG. 5. This rotation of the pinions in racks 24 causes a downward movement of the wheels thereby causing their downward pressure on the plank. This downward pressure causes deformation of the peripheral portions of wheels 30 thereby increasing contact area and frictional resistance to slipping. The action is cumulative and the downward pressure of the wheels on the plank quickly becomes sufficient to arrest any further kickback movement of the plank. Forward movement of the plank following the arrest of a kickback disengages the pinions from the racks and releases downward pressure on the wheels.

Figure 6:
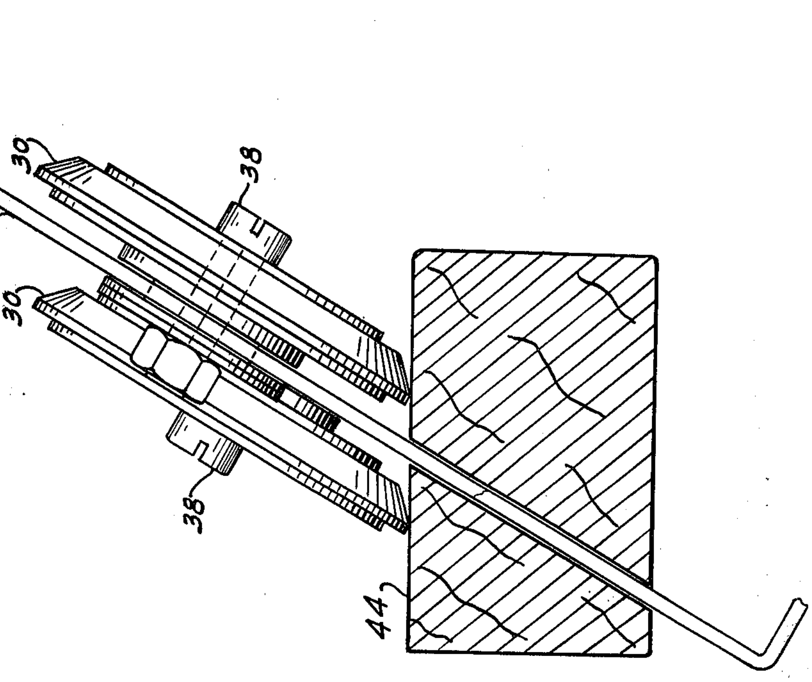
FIG. 6 is an enlarged end elevational view taken along line 6—6 of FIG. 2 showing the spreader and anti-kickback device in a tilted position as when making a bevel cut.

If a kickback of one or the other of the separated portions of the plank occurs at a time when the plank is completely ripped, the wheel riding on that portion will effectively arrest its kickback movement in the manner described above. The wheels 30 have axial extending and bevelled peripheral surfaces 45 and 46 thereby to provide optimum contact with the workpiece surface when the wheels are either perpendicular to the workpiece surface or inclined thereto when making a bevel cut as shown in FIG. 6.

Figure 7:
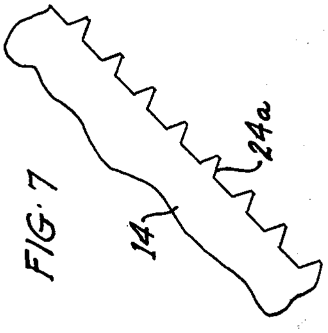
FIG. 7 is a fragmentary side elevational view showing a skip-tooth modification of the rack.

Referring to FIG. 7 a fragmentary portion of a skiptooth rack 24*a* is shown. This form of rack may be employed in lieu of the rack 24 with equal effectiveness and may be formed with greater uniformity by an inexpensive method. Referring to FIG. 3, the thickness of the low friction plastic washers lying between the wheels 30 and pinion gears 26 are made thick enough to insure that the wheels will not drop into the kerf of a workpiece.

The single-wheel type anti-kickback device shown in FIGS. 8 and 9 is mounted on the spreader 14*a* of a table saw and includes the same elements arranged in the same manner and functions in the same manner in arresting kickbacks as one of the assemblies in the two-wheel type described except for its wheel 30*a*. The synthetic rubber wheel 30*a* employed in the single-wheel device is somewhat thicker than the wheels 30 of the two-wheel device and has oppositely bevelled peripheral surfaces 48 on opposite sides of an axially extending surface 50, see FIG. 9.

Inasmuch as the operator of a table saw may for convenience place the fence or workpiece guide on either side of the saw blade and inasmuch as kickbacks occur as the result of that cut portion of the workpiece lying between the saw blade and fence being thrown backward by the saw blade, the single wheel of this device is arranged to be conveniently assembled with the wheel 30*a* on either side of spreader 14*a* so that it may ride on that portion of the workpiece lying between the saw blade and fence. The oppositely bevelled peripheral surfaces 48 on wheel 30*a* provide optimum contact area between the wheel 30*a* and the workpiece surface when the saw blade and spreader are tilted to attain a bevel cut regardless of which side of the spreader the wheel 30*a* is on.

The vertical extension of the slots above a worktable may be varied to accommodate the thickness of workpieces to be processed and they may extend perpendicularly or at various acute angles to perpendicularity with the surface of a worktable so as to provide the desired combination of mechanical and gravitational advantages. Also, the relative diameters of the wheels and pinion gears may be varied, but the slots must be of such width between the rack teeth and smooth sides to permit a horizontal movement of the pinion gears to positions of full engagement and clear disengagement with the racks. While the smooth, deformable, non-marring wheels described function effectively and reliably on all kinds of workpiece surfaces under the downward pressure of gravity, the exclusive use of wheels constructed of other materials or having knurled or toothed peripheral surfaces or other treatment thereof to increase friction and prevent slippage on the surface of a workpiece is contemplated.

It will be apparent that the single-wheel type anti-kickback device is readily adaptable to mounting in a slot in the fence of a jointer plane and that the two-wheel type is readily adaptable to mounting in slots formed in the spreader of a radial arm saw thereby to function when a kickback occurs during "in" or "out" ripping. The exclusive use of these and other adaptations of the device within the spirit of the invention wherein the device is mounted in a vertically extending slot or slots in a member extending above a horizontal worktable and fixed or adjustably fixed against vertical movement relative to the worktable is contemplated.

We claim:

1. An anti-kickback device for arresting the reverse movement of a workpiece being moved in one direction on a horizontal table comprising; a support member extending upward above said table and fixed against vertical movement relative to said table, an elongated slot in said member extending longitudinally upward from said table, said slot having a surface defined along one longitudinal side of said slot and said surface being formed as a rack, a wheel lying alongside said member and having a coaxial pinion gear of smaller diameter fixed to one side thereof and entered into said slot, said pinion gear being sufficiently smaller in diameter than the width of said slot to permit the horizontal movement thereof into and out of engagement with said rack, means loosely retaining said pinion gear in said slot thereby permitting said wheel to gravitate and rest on the upper surface of said workpiece and to be moved horizontally by said workpiece in a direction to disengage and maintain disengagement of said pinion gear from said rack and to be rotated in one direction when said workpiece is moving in said one direction, and to be moved horizontally in an opposite direction to engage and maintain engagement of said pinion gear in said rack and to be rotated in an opposite direction to cause said pinion gear fixed thereto to be rotated in a direction in said rack to apply a downward force through said wheel to said workpiece when said workpiece moves in an opposite direction.

2. The anti-kickback device claimed in claim 1 in which said elongated slot in said member extends longitudinally upward from said table at an acute angle and said rack is formed on the upper longitudinal side thereof.

3. The anti-kickback device claimed in claim 1 in which said support member is flat and extends perpendicularly above said table and functions additionally as a fence or guide for said workpiece.

4. The anti-kickback device claimed in claim 1 in which said support member is flat, extends perpendicularly above said table and functions additionally as a spreader for entering the kerf of a workpiece.

5. The anti-kickback device claimed in claim 1 in which said support member is flat, in which said pinion gear is slightly thicker face to face than the thickness of said support member and in which said pinion gear is retained in said member with limited axial movement by washers of larger diameter than the width of said slots lying against and fixed to opposite faces of said pinion gear.

6. The anti-kickback device claimed in claim 5 in which said washers are constructed of low friction synthetic plastic material.

7. The anti-kickback device claimed in claim 1 in which said wheel has a circumferentially extending smooth surface and a circumferentially and radially extending deformable peripheral portion.

8. The anti-kickback device claimed in claim 1 in which said wheel is constructed of a relatively easily deformable, rubber-like synthetic material having recovery capability and is provided with rigid support discs of smaller diameter than the wheel pressed against and fixed to opposite faces of said wheel.

9. The anti-kickback device claimed in claim 1 in which said pinion gear is slightly thicker than said support member and is loosely retained in said slot by washers of greater diameter than the width of said slot lying against opposite faces of said pinion gear, in which said wheel and pinion gear have central non-circular perforations therein and in which bolt means having a similar non-circular intermediate portion passing through said perforations forms a driving connection between said wheel and pinion gear and detachably holds said wheel, pinion gear and washers in fixed relationship, whereby said wheel may be conveniently assembled on either side of said support member.

10. An anti-kickback device for a power saw having a horizontal worktable, a rotating circular saw blade and a spreader extending above said worktable and fixed against vertical movement relative thereto and arranged to enter the kerf of a workpiece lying on said table and being ripped, a pair of horizontally spaced, elongated slots in said spreader extending upward in parallel relationship above said worktable, each of said slots having a surface defined along the same longitudinal side thereof, and said surfaces being formed as racks, a pair of wheels lying on opposite sides of said spreader each having a pinion gear of smaller diameter fixed to one side thereof and entered into each of said slots, said pinion gears being sufficiently smaller in diameter than the width of said slots to permit their horizontal movement into and out of engagement with said racks, means loosely retaining said pinion gears in said slots thereby to permit said attached wheels to gravitate and rest on the surfaces of the ripped portions of said workpiece lying on opposite sides of said spreader and to be moved horizontally in a direction to disengage and maintain disengagement of said pinion gears and to be rotated in one direction when said workpiece moves horizontally in one direction and to be moved horizontally in an opposite direction to engage and maintain engagement of said pinion gears in said racks and to be rotated oppositely in a direction to cause said pinion gears to be rotated in said racks in a direction to cause downward pressure to be applied to the surfaces of said workpiece portions when said workpiece moves horizontally in an opposite direction.

11. The anti-kickback device claimed in claim 10 in which said elongated slots in said spreader extend longitudinally upward from said table at an acute angle with said racks being formed on the upper longitudinal sides thereof.

12. The anti-kickback device claimed in claim 10 in which said saw blade and spreader are stationary and said workpiece moves horizontally on said worktable relative thereto.

13. The anti-kickback device claimed in claim 10 in which said saw blade and spreader are movable horizontally relative to said worktable and said workpiece.

14. The anti-kickback device claimed in claim 10 in which said pinion gears are slightly thicker face to face than the thickness of said spreader and in which said pinion gears are loosely retained axially in said slots by washers of larger diameter than the width of said slots lying against opposite faces of said pinion gears and in which one or more washers space said wheels from the sides of said spreader sufficiently to preclude their dropping in the kerf of a ripped workpiece.

* * * * *